UNITED STATES PATENT OFFICE.

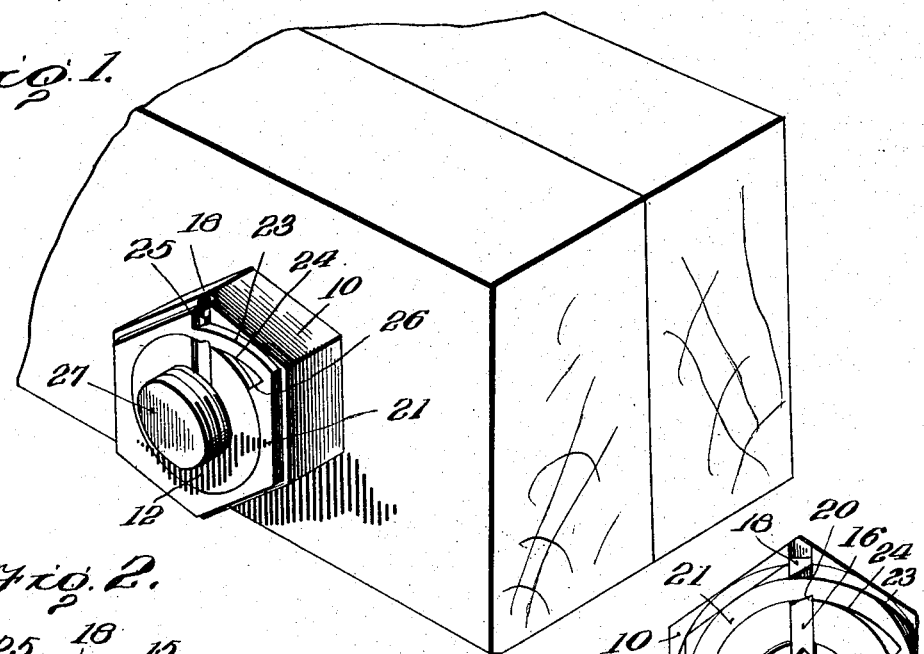
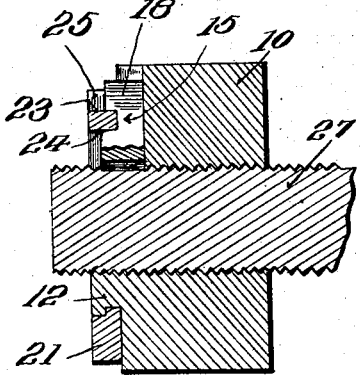
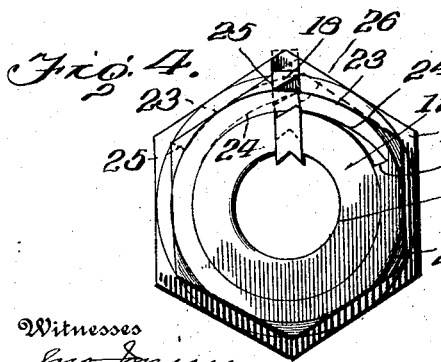
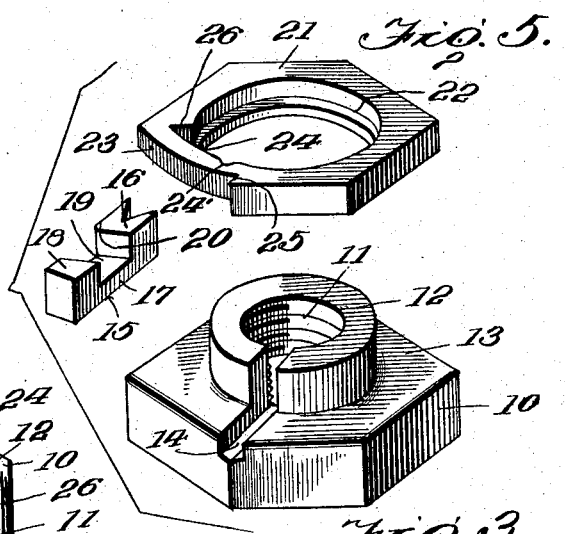

HENRY E. ZIPLINSKY, OF LANCASTER, PENNSYLVANIA.

NUT-LOCK.

1,190,360. Specification of Letters Patent. Patented July 11, 1916.

Application filed March 6, 1915. Serial No. 12,637.

*To all whom it may concern:*

Be it known that I, HENRY E. ZIPLINSKY, a citizen of the United States, residing at Lancaster, in the county of Lancaster and State of Pennsylvania, have invented certain new and useful Improvements in Nut-Locks, of which the following is a specification.

This invention contemplates an improved nut lock and has as its primary object to provide a device of this character having as its salient feature, simplicity of construction to the end that it may be readily manufactured and placed upon the market at a feasible cost.

The invention has as a further object to provide a nut lock which will be entirely practicable in use, which may be applied to any conventional type of bolt without the necessity of structural change therein, and which may be securely locked in engagement with the bolt to reduce to a minimum, the possible accidental disengagement of the nut therefrom. And the invention has as a still further object in this connection, to provide a nut lock employing a rotatably mounted locking member adapted to coact with a locking dog provided for automatically moving the said dog either into or out of engagement with the bolt upon the rotation of the member.

Other objects will appear as the description proceeds and in the drawings wherein I have illustrated the preferred embodiment of my invention and wherein similar reference characters designate corresponding parts throughout the several views, Figure 1 is a perspective view of my improved nut lock, Fig. 2 is a horizontal sectional view showing the locking dog moved to engage the bolt, Fig. 3 is a perspective view showing the parts detached from each other, but in proper operative position, Fig. 4 is a plan view showing in full lines, the dog moved to engage the bolt, and in dotted lines, the dog moved out of engagement with the bolt, and Fig. 5 is a view showing a slight modification in the construction of locking dog employed.

In the preferred embodiment of my invention as illustrated in the drawings, I employ a nut 10 which is preferably formed with peripheral flat faces to receive a wrench and is provided centrally with an internally screw threaded bore 11. Formed on the nut upon one side thereof, is an upstanding annular sleeve or reduced extension 12 which surrounds the bore of the nut and which is internally screw threaded to form a continuation of the screw threads of the nut.

It will be observed that the adjacent side face 13 of the nut is flat and smooth and formed in said face upon one side of the nut is a radially extending slot 14, which opens, at one extremity, through the sleeve 12 to communicate with the bore 11, and, at its opposite extremity, through the adjacent side face of the nut. Slidably mounted in the slot 14 is a dog 15 which includes a terminal upstanding head 16, the outer face of which is notched to form biting edges. Extending laterally from the head 16 at one extremity thereof, is a shank 17 which is provided terminally with an upstanding laterally projecting lug or arm 18 disposed in a plane with the head 16. The head 16 and lug 18 define an intermediate slot 19 having substantially parallel side walls extending obliquely to the longitudinal axis of the dog. Formed on the head 16 at one extremity of the adjacent wall of said slot, is a shoulder or tooth 20.

Rotatably mounted upon the sleeve 12 is a locking member or ring 21, the said ring seating upon the flat face 13 of the nut and being preferably provided with flat peripheral faces adapted to receive a wrench. The ring 21, upon one side thereof, is provided with an annular recess 22 and the upper margin of the sleeve 12 is overturned to seat within said recess, thus operatively connecting the ring with the nut.

The opposite edges of the ring 21 upon one side of the ring are cut away to provide oppositely disposed concentric arcuate faces or shoulders 23 and 24 respectively, which are arranged eccentric to the axis of rotation of the said ring, the adjacent portion of the ring freely fitting within the slot 19 and operatively connecting the dog with the nut, with the faces 23 and 24 confronting the opposite walls of said slot. Formed at one extremity of the face 23 is a radially and laterally extending shoulder 25 and formed at the reverse extremity of the face 24 is a radially and laterally projecting shoulder 26, the shoulders 25 and 26 confronting each other and extending in opposite directions.

It will now be observed that when the ring 21 is rotated upon the sleeve 12 in one direction, the face 23 of the said ring will engage the adjacent wall of the slot 19 to move the dog 15 radially within the slot 14 toward the periphery of the nut. The head 16 of the said dog will accordingly be moved to a position upon one side of the bore 11 away from the bolt conventionally shown at 27.

When the ring 21 is thus actuated, to move the dog as just described and to cause the shoulders 25 and 26 to travel in an arcuate path, the head 16 of the dog will assume a position in the path of the shoulder 26, the said shoulder being adapted to engage the head for limiting the movement of the ring with the dog disposed in inoperative position.

The rotation of the ring 21 in a direction reverse to that just previously described, will cause the face 24 of said ring to engage within the slot 19 of the dog and consequently move the dog radially within the slot 14 to a position with the head 16 thereof projected into the bore 11 of the nut, the biting edges 17 being adapted to effectually engage the bolt for locking the nut in position thereon. When the dog 15 is so moved, the lug 18 will assume a position in the path of the shoulder 25, the said shoulder being adapted to engage the lug for limiting the dog in its movement disposed in operative position.

Formed in the face 24 of the locking ring adjacent one extremity thereof is a notch 24', and particular attention is now directed to the fact that when the dog 15 is moved to operative position as best shown in Figs. 1 and 4 of the drawings, the tooth 20 of the dog is adapted to engage in said notch to thus hold the locking ring stationary and preventing the retrograde movement thereof. The dog is thus adapted to coact with the locking ring for locking the dog in operative position and in any case where it is likely that the nut is to be removed, the tooth 20 of the dog will be formed with a rounded edge as particularly shown in Fig. 3 of the drawings, so that the locking washer may be sprung out of engagement with the said tooth. However, in any case where the nut is to be permanently secured to the bolt, the said tooth will be formed with a sharp edge as shown in Fig. 5.

It will therefore be seen that I provide an exceedingly simple construction wherein but very few parts are employed which may be readily produced and assembled. It will further be seen that the nut 10 may be readily locked upon the bolt by simply actuating the locking ring and may be as easily disconnected from the bolt. It is also to be observed that in the provision of the rotatably mounted locking member, the locking dog employed will, under ordinary circumstances, be held, in practical use, securely in engagement with the bolt, and in providing a locking member of this type, the possibility of the accidental release of the locking dog through vibration, or other causes, will be reduced to a minimum.

Having thus described my invention, what I claim and desire to secure by Letters Patent is:—

1. A device of the character described including a nut bored to receive a bolt, a dog movable upon the nut to project into the bore thereof, a locking member rotatably mounted upon the nut and operatively engaging the dog for moving the dog to operative and inoperative positions, and means disposed radially upon opposite sides of the locking member and adapted to limit said member in its rotative movement in opposite directions.

2. A device of the character described including a nut bored to receive a bolt, a dog movable upon the nut to project into the bore thereof, a rotatably mounted locking member operatively engaging the dog for actuating the said dog, and radially disposed means carried by the said member and adapted to engage the dog for limiting the movement of the locking member in opposite directions.

3. A device of the character described including a nut bored to receive a bolt, a dog movable upon the nut to project into the bore thereof, and a rotatable locking member mounted upon the nut concentric to the axis thereof, the said locking member being cut away upon one side to provide faces eccentric to the axis of rotation of the member and adapted to operatively engage the dog for moving the dog to operative and inoperative positions and to provide radially disposed shoulders adapted to engage the dog for limiting the locking member in its rotative movement in opposite directions.

4. A device of the character described including a nut bored to receive a bolt, an extension formed on the nut and surrounding the said bore, a dog movable upon the nut to project into the bore thereof, and a locking ring swiveled upon said extension concentric to the axis of the said bore, the said ring being provided with portions eccentric to the axis of rotation of the ring and operatively engaging the dog for moving the dog to operative and inoperative positions.

5. A device of the character described including a nut bored to receive a bolt, a dog carried by the nut, said dog including a head and having a lug formed thereon, the dog being movable to operative position with the head projected into the bore of the nut and to inoperative position with the head disposed upon one side of the said bore, a locking member rotatably mounted upon the nut concentric to the axis thereof, said locking member being provided with portions arranged eccentric to the axis of rotation of the member and operatively engaging the dog for actuating the said dog, and shoulders formed on the said member, one of said shoulders being adapted to engage said lug for limiting the member in its rotative movement with the dog disposed in operative position and the other of said shoulders being adapted to engage the head for limiting the member in its rotative movement with the dog disposed in inoperative position.

6. A device of the character described including a nut bored to receive a bolt, a radially disposed dog movable upon the nut to one position to project into the bore thereof and to another position upon one side of said bore, said dog including a head adapted to engage a bolt and having a lug formed thereon, a rotatable locking member mounted upon the nut concentric with the axis thereof, said member being formed with oppositely disposed curved shoulders eccentric to the axis of rotation of the member and operatively engaging the dog, and radially extending shoulders formed at reverse extremities of said first mentioned shoulders and adapted to travel in an arcuate path upon the member, whereby rotation of the member in one direction will move the dog to said first mentioned position with one of said shoulders engaging said lug and rotation of the member in an opposite direction will move the said dog to said second mentioned position with the other of said shoulders in engagement with said head.

7. A device of the character described including a nut bored to receive a bolt, a dog movable upon the nut to project into the bore thereof and provided with a notch having one wall thereof forming a shoulder, and a locking member shiftably mounted upon the nut and engaging in said notch for moving the dog to operative position with the said shoulder bearing into the locking member for holding the member stationary.

8. A device of the character described including a nut bored to receive a bolt, a dog movable upon the nut to project into the bore thereof and provided with a notch, a locking member shiftably mounted upon the nut and engaging in said notch for moving the dog, and radially disposed shoulders formed on the locking member and adapted to engage the dog for limiting the said member in its movement in opposite directions.

9. A device of the character described including a nut bored to receive a bolt, a dog movable upon the nut to project into the bore thereof, a locking member freely engaging the dog for moving the dog in opposite directions, and radial means carried by the locking member and adapted to engage the dog for limiting the movement of the dog in each direction.

10. A device of the character described including a nut bored to receive a bolt, a dog shiftable upon a nut to operative position projecting into the bore thereof and provided with a shoulder, and a locking member rotatable upon the nut for shifting the dog and provided with a notch receiving said shoulder for holding the member stationary in the operative position of the dog.

11. A device of the character described including a nut bored to receive a bolt, a dog shiftable upon the nut to project into the bore thereof, and a rotatable locking member freely mounted for sliding movement upon one side face of the nut and engaging the dog for shifting said dog.

In testimony whereof I affix my signature in presence of two witnesses.

HENRY E. ZIPLINSKY. [L. S.]

Witnesses:
  W. H. KREADY,
  WM. E. COGLEY.

Copies of this patent may be obtained for five cents each, by addressing the "Commissioner of Patents, Washington, D. C."